(12) United States Patent
Neto

(10) Patent No.: US 7,708,026 B2
(45) Date of Patent: May 4, 2010

(54) FLUID JET WITH NOISE REDUCING SLEEVE

(75) Inventor: Jose Correa Neto, Rochester, MI (US)

(73) Assignee: Metaldyne, LLC, Plymouth, MI (US)

( * ) Notice: Subject to any disclaimer, the term of this patent is extended or adjusted under 35 U.S.C. 154(b) by 0 days.

(21) Appl. No.: 12/006,363

(22) Filed: Jan. 2, 2008

(65) Prior Publication Data

US 2008/0210314 A1    Sep. 4, 2008

(51) Int. Cl.
*F16K 15/04*    (2006.01)
*F01P 3/08*    (2006.01)

(52) U.S. Cl. ............. 137/539; 137/533.19; 137/543.19; 123/41.35

(58) Field of Classification Search ............... 137/454.2, 137/454.4, 454.5, 454.6, 533.19, 539, 543.19; 123/41.35, 196 R
See application file for complete search history.

(56) References Cited

U.S. PATENT DOCUMENTS

| | | | | |
|---|---|---|---|---|
| 1,106,837 | A | * | 8/1914 | Pfaehler et al. ............. 137/539 |
| 1,572,464 | A | * | 2/1926 | Bjorklund .................... 137/539 |
| 1,574,537 | A | * | 2/1926 | Burch ......................... 137/539 |
| 1,999,693 | A | * | 4/1935 | Hill ............................. 137/539 |
| 2,676,782 | A | * | 4/1954 | Bostock et al. ............. 137/469 |
| 2,704,549 | A | * | 3/1955 | Strnad ........................ 137/469 |
| 2,800,119 | A | | 7/1957 | Schmidl |
| 3,365,648 | A | | 1/1968 | Benjamin |
| 3,480,113 | A | | 11/1969 | Pope et al. |
| 3,485,324 | A | | 12/1969 | Novak |
| 3,894,556 | A | | 7/1975 | Pareja |
| 4,365,648 | A | | 12/1982 | Grothe |
| 4,869,211 | A | | 9/1989 | Heberle et al. |
| 4,995,346 | A | | 2/1991 | Hudson, Jr. |
| 5,533,472 | A | | 7/1996 | Sands et al. |
| 5,881,684 | A | | 3/1999 | Bontaz |
| 5,967,180 | A | | 10/1999 | Yates, III |
| 6,672,262 | B2 | | 1/2004 | Bontaz |
| 6,840,270 | B2 | | 1/2005 | Yu et al. |

FOREIGN PATENT DOCUMENTS

| | | |
|---|---|---|
| JP | 03-168317 | 11/2001 |
| JP | 2003184549 | 7/2003 |

* cited by examiner

*Primary Examiner*—John Rivell
(74) *Attorney, Agent, or Firm*—McDonald Hopkins LLC

(57) ABSTRACT

Pressure actuated oil jets have long been used to cool the underside of the pistons in such reciprocating engines. The present disclosure is a fluid jet for providing fluid under pressure to a desired location. The fluid jet comprises a valve body, at least one fluid passage extending longitudinally within at least a portion of the valve body, a fluid pressure actuated valve element located within the valve body and moveable longitudinally therein between a valve open position and a valve closed position, and a sleeve extending inwardly within said valve body, wherein said valve element is retained within said sleeve when oil pressure drops below a predetermined threshold.

19 Claims, 3 Drawing Sheets

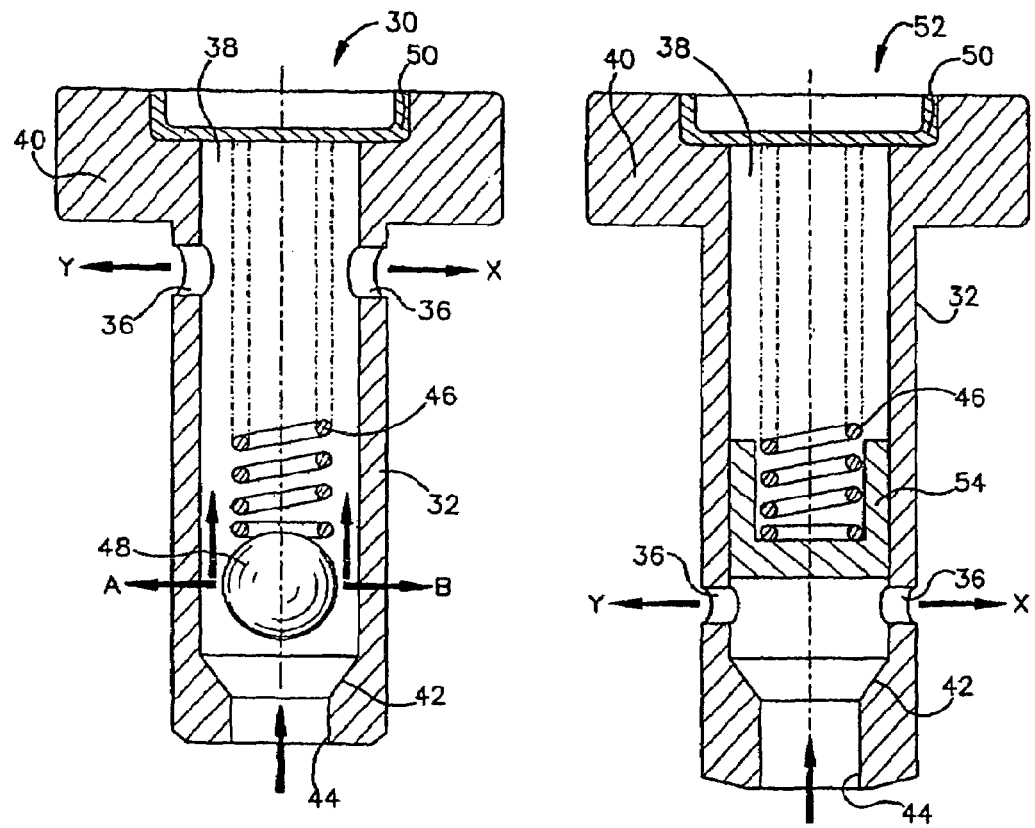
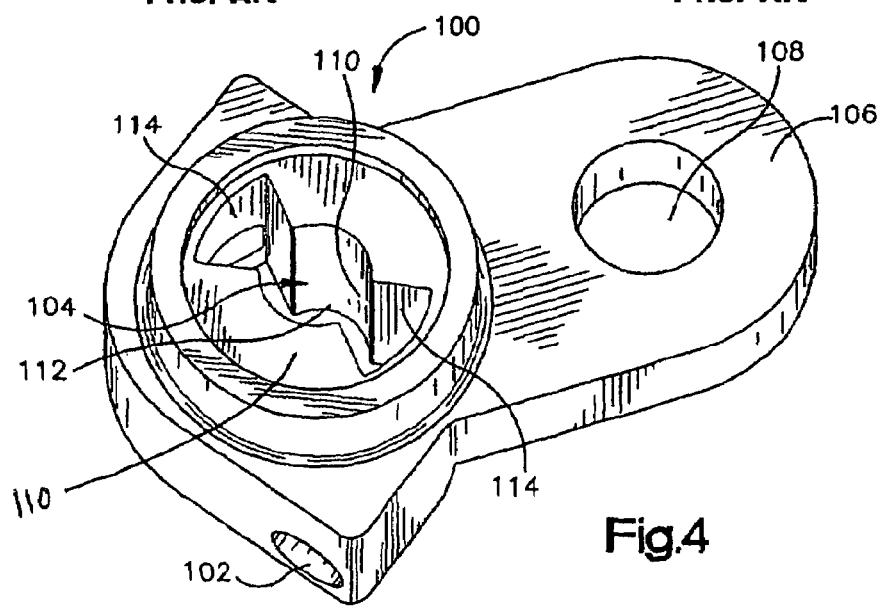
Fig.2 Prior Art
Fig.3 Prior Art
Fig.4

FLUID JET WITH NOISE REDUCING SLEEVE

CROSS-REFERENCE TO RELATED APPLICATIONS

This application claims priority from U.S. patent application Ser. No. 11/314,953, entitled "FLUID JET WITH NOISE REDUCING SLEEVE", filed on Dec. 21, 2005 which claims priority to U.S. Provisional Patent Application Ser. No. 60/637,968 filed on Dec. 21, 2004, which are each incorporated by reference in their entirety.

FIELD OF THE INVENTION

The present invention relates generally to fluid jets for providing fluid under pressure to a desired location, and more particularly, to a fluid jet having a noise reducing portion to prevent "knocking."

BACKGROUND

The pistons of gasoline engines, diesel engines, and high performance engines become easily overheated during operation. Pressure actuated oil jets have long been used to cool the underside of the pistons in such reciprocating engines. Such oil jets are often mounted in a bore on the underside of the engine block and receive oil under pressure from an oil gallery. These oil jets also incorporate a check valve to supply oil to the oil jet when a predetermined oil pressure is achieved and also prevent siphoning off of needed oil pressure during low oil pressure conditions.

Oil jets spray oil into cooling channels on the underside of the pistons, cooling the piston crowns and surrounding cylinder wall by absorbing heat (thus lowering combustion chamber temperatures). This occurs while the engine is running. This practice reduces piston temperatures, which helps the engine develop more power and assists in lubricating the piston and cylinder wall to increase durability. The extra oil layer on the cylinder bores and reciprocating components also minimizes noise that typically emanates from these components. The optimum operating temperatures also enhance the life of the critical engine parts and reduce maintenance costs.

There are two standard types of pressure actuated oil jets used in the industry, each comprising a two-part configuration. As shown in FIG. 1, typical pressure actuated oil jets comprise a two-piece construction comprising an oil jet body 10 and an oil jet valve 12. The oil jet body 10 comprises a main body 14 having a valve aperture 16 at one end and a bolt-receiving aperture 18 at the other end. Extending from the sides of the main body 14 are two nozzles 20 that are in fluid communication with the interior of the valve aperture 16.

The valve 12 generally comprises a tubular sleeve 22 having a threaded exterior portion 24 and a pair of oil exiting apertures 26. The sleeve 22 is further connected to an oversized head 28 at one end. Therefore, in assembly of the typical two-piece oil jet assembly, the valve 12 is inserted within the valve aperture 16 until the oil exiting apertures 26 of the valve 12 line up with the nozzles 20. The threaded portion 24 of the valve 12 threadedly engages a threaded bore in the lower portion of the engine block that transfers oil under pressure from the oil gallery to the valve 12.

There are generally two valve constructions used in the industry to handle pressure actuation: a ball valve construction (shown in FIG. 1A) and a piston valve construction (shown in FIG. 1B). While both constructions are further described below, it should be understood that for simplicity, like elements are identified by like numbers.

As best shown in FIG. 2, the ball valve 30 comprises a tubular sleeve 32 connected at one end to an oversized head 40. The sleeve further includes a pair of oil exiting apertures 36 which communicate with the nozzles of the oil jet body when the ball valve is placed within the valve body 10. A bore 38 extends through the head 40 and sleeve 32 as a passage for oil entering the ball valve 30. At the end opposite the head 40, the bore 38 tapers to create a seat 42 that communicates with an oil entrance opening 44.

A spring 46 is held within the bore 38 and urges a ball 48 against the seat 42 to create a valve-closed position. A cap 50 is placed over the bore 38 at the head 40 to retain the spring 46 within the sleeve 32. When the oil pressure is above a predetermined value, oil under pressure passes through the oil entrance opening 44 to overcome the spring force and depress the ball 48 against the spring 46 thereby creating a valve open position. The oil under pressure enters the bore 38 and exits the oil exiting openings 36 as indicated by the arrows X and Y of FIG. 2. The oil exiting apertures 36 are in fluid communication with the nozzles in the separate body 10 that direct oil to the pistons. When the oil pressure falls below a predetermined value, the spring 46 urges the ball 48 against the seat 42 to prevent a siphoning off of oil pressure and creates a valve-closed position.

A particular disadvantage with the ball valve construction is that the ball 48 flutters, oscillates, or vacillates at low or transitional oil pressure. When the oil pressure in the oil jet is not great enough to overcome the spring force and depress the ball 48 against the spring 46, the ball 48 flutters in place. This flutter causes a noise that is audible to the operator and/or the passenger of the vehicle into which the oil jet is installed. Additionally, when the oil pressure falls below a predetermined value, the spring 46 urges the ball 48 against the seat 42. This causes the ball 48 to "knock" against the seat 42, again, causing a noise audible to the operator and or the passenger of the vehicle into which the oil jet is installed.

As shown in FIG. 3, the second oil jet configuration comprises a piston valve construction. The piston valve 52 comprises a tubular sleeve 32 connected at one end to an oversized head 40. The sleeve 32 further includes a pair of oil exiting apertures 36 at its lower end which communicate with the nozzles of the separate oil jet body 10. A bore 38 extends through the head 40 and sleeve 32 as a passage for oil entering the piston valve 52. At the end opposite the head 40 and below the oil exiting apertures 36, the bore 38 tapers to create a seat 42 that communicates with an oil entrance opening 44.

A spring 46 is held within the bore 38 and urges a piston 54 against the seat 42 to create a valve-closed position. A cap 50 is placed over the bore 38 at the head 40 to retain the spring 46 within the sleeve 32. When the oil pressure is above a predetermined value, oil under pressure passes through the oil entrance opening 44 to overcome the spring force and depress the piston 54 and reveal the oil exiting apertures 36 thereby creating a valve open position. The oil under pressure enters the bore 38 and exits the oil exiting openings 36 as indicated by the arrows Y and X of FIG. 3. The oil exiting openings 36 are in fluid communication with the nozzles in the separate body 10 that direct oil to the pistons. When the oil pressure falls below a predetermined value, the spring 46 urges the piston 54 against the seat 42 to prevent a siphoning off of oil pressure and creates a valve-closed position.

The piston valve construction suffers from the similar disadvantage, although not as severally, as the ball valve construction. The piston 54 can flutter at low or transitional oil pressure. When the oil pressure in the oil jet is not great enough to overcome the spring force and depress the spring 54 against the spring 46, the piston 54 can flutter in place. This flutter causes a noise that is audible to the operator and/or the passenger of the vehicle into which the oil jet is installed. Additionally, when the oil pressure falls below a predetermined value, the spring 46 urges the piston 54 against the seat 42. This causes the piston 54 to "knock" against the seat 42, again, causing a noise audible to the operator and or the passenger of the vehicle into which the oil jet is installed.

Therefore, there is a need in the art to create a fluid jet that operates in a quieter manner and does not flutter at low or transitional oil pressures or knock against the seat when oil pressure drops and the spring urges the ball or piston against the seat.

SUMMARY OF THE INVENTION

Accordingly, the present invention provides a fluid jet. The fluid jet comprises a valve body, at least one fluid passage extending longitudinally within at least a portion of the valve body, a fluid pressure actuated valve element located within the valve body and moveable longitudinally therein between a valve open position and a valve closed position, and a sleeve extending inwardly within said valve body, wherein said valve element is retained within said sleeve when oil pressure drops below a predetermined threshold.

In another embodiment, a fluid jet comprises a valve body, a valve element-retaining region extending longitudinally within at least a portion of the valve body, at least one fluid passage extending longitudinally within at least a portion of the valve body and in fluid communication with at least a portion of the valve element-retaining region, at least one fluid-exiting aperture through the valve body in fluid communication with the at least one fluid passage, a fluid pressure actuated valve element located within the valve element-retaining region and moveable longitudinally therealong between a valve open position and a valve closed position, and a sleeve extending inwardly within the valve body to allow the valve element to float within the sleeve at low and transitional pressures and to prevent the valve element from knocking as pressure drops.

In yet another embodiment, a fluid jet comprises a valve body, a valve element-retaining region extending longitudinally within at least a portion of the valve body, at least one fluid passage extending longitudinally within at least a portion of the valve body and in fluid communication with at least a portion of the valve element-retaining region, at least one fluid-exiting aperture through the valve body in fluid communication with the at least one fluid passage, a fluid pressure actuated valve element located within the valve element-retaining region and moveable longitudinally therealong between a valve open position and a valve closed position, and cap connected to the valve body, the cap having a sleeve extending inwardly within the valve body to allow the valve element to float within the sleeve at low and transitional pressures and to prevent the valve element from knocking as pressure drops.

DESCRIPTION OF THE DRAWINGS

The operation of the present invention may be better understood by reference to the following detailed description taken in connection with the following illustrations, wherein:

FIG. 2 is an enlarged view of FIG. 1A;

FIG. 3 is an enlarged view of FIG. 1B;

FIG. 4 is perspective view of an embodiment of a oil jet of the present invention;

DETAILED DESCRIPTION

The following detailed description is directed to certain embodiments of the present invention. It should be understood that nothing in the following description of these embodiments should limit the scope of the invention to the embodiments shown and described.

Figure 1:
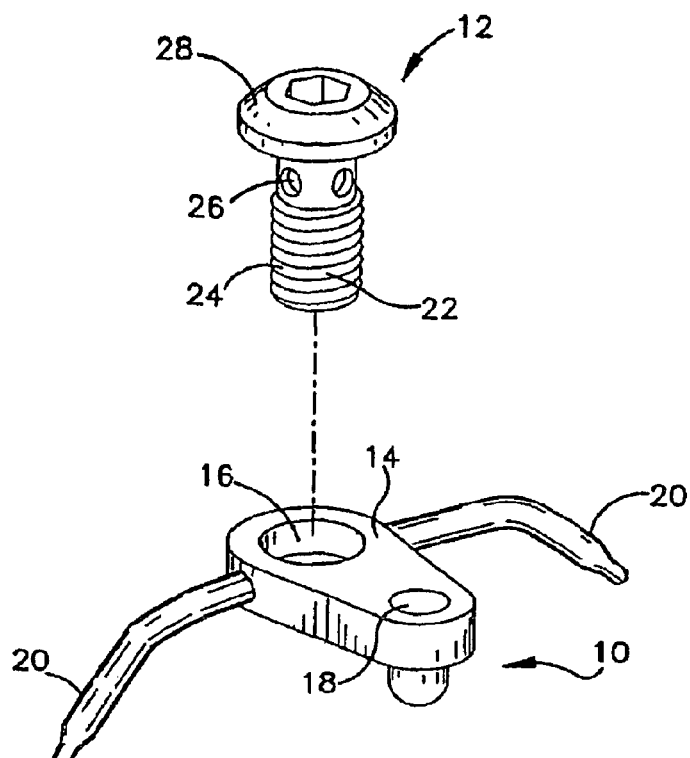
FIG. 1 is an exploded view of a prior art oil jet valve and oil jet body prior to assembly.
Figure 1A:
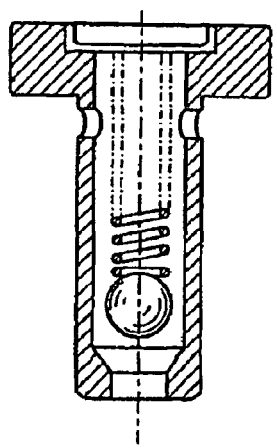
FIG. 1A is a cross-sectional view of a prior art oil jet valve of a ball-type check valve.
Figure 1B:
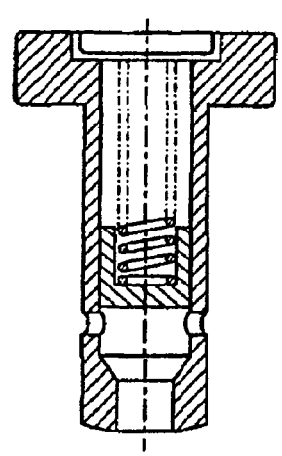
FIG. 1B is a cross-sectional view of a prior art oil jet valve of the piston valve type.
Figure 5:
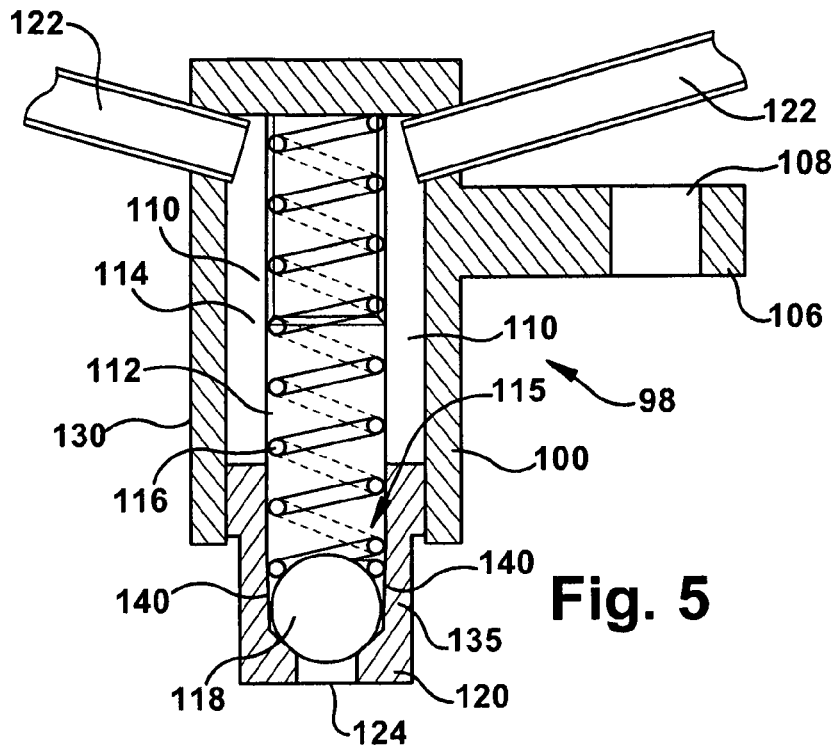
FIG. 5 is a cross-sectional view of an embodiment of an oil jet.
Figure 6:
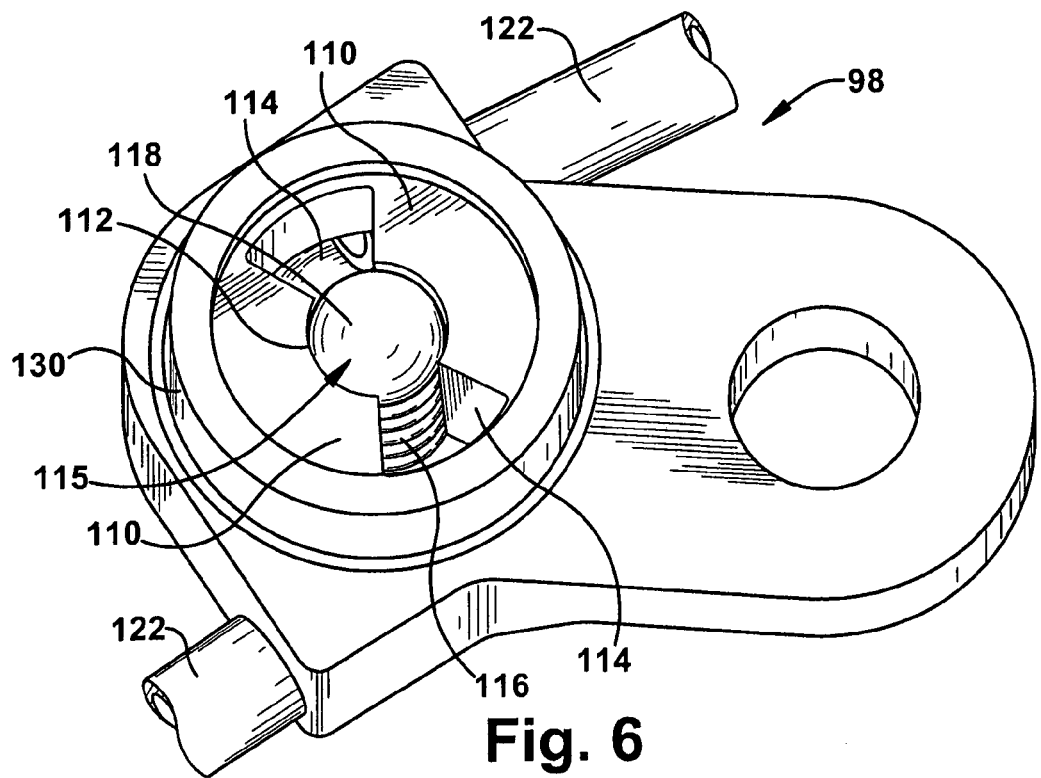
FIG. 6 is a perspective view of the oil jet of FIG. 5 without the cap so as to show details within the valve element-retaining region.

With reference to FIGS. 4-6, and as best shown in FIG. 5, an oil jet, generally designated as 98 utilizes a valve body 100 having an integral valve element-retaining region 112. Enclosed within the valve element-retaining region 112 is a spring biased valve element 115 retained therein by a cap 120 connected to the valve body 100. A nozzle 122 is connected to the valve body 100 so as to direct oil under pressure to a desired location.

As best shown in FIG. 4, the valve body 100 is a die cast, one-piece component that can be manufactured from powdered metal due to its relatively low cost and ease of use. The valve body 100 has an integrally formed valve element-retaining region 112, at least one fluid passage 114 in fluid communication with the valve element-retaining region 112, and at least one fluid-exiting aperture 102 extending through the valve body 100 in fluid communication with the at least one fluid passage 114. As shown in the drawings, the valve body 100 utilizes a pair of fluid passages 114 in fluid communication with the valve element-retaining region 112 and a pair of fluid-exiting apertures 102 in fluid communication with the associated fluid passages 114. Alternatively, the valve body 100 may utilize one or any other number of fluid passages in fluid communication with the valve element-retaining region 112. Additionally and in the alternative, one or any number of fluid-exiting apertures may be used.

With continued reference to FIG. 4, the valve element-retaining region 112 extends longitudinally within at least a portion of the valve body 100 for preventing the valve element 115 from vacillating within the valve body 100 when the oil pressure in the valve-retaining region 112 has overcome the spring force. This further prevents fluid aeration and cavitation during a valve-open position. In the present embodiment, a pair of confronting walls 110 extending longitudinally within at least a portion of the valve body 100 and integral therewith defines the valve element-retaining region 112. The walls 110 extend inwardly within the cavity 104 to define the valve element-retaining region 112. As shown, at least a portion of the surface of the walls 110 are semi-circular in shape so as to retain the valve element ball or piston, as the case may be, generally between the retaining region orifice and its base when the oil pressure has overcome the spring force. However, other wall configurations could be utilized to prevent the valve element 115 from vacillating within the valve body 100.

The fluid passages 114 extend longitudinally within at least a portion of the valve body 100 and are in fluid communication with at least a portion of the valve element-retaining region 112. In the present embodiment, the oil passages 114 are at least partially defined by the walls 110. More specifically, the oil passages 114 are located opposite each other about the valve retaining region 112 and are each in fluid communication with the valve retaining region 112 longitudinally therealong. However, it should be clear that numerous other positions and configurations for the oil passages could be utilized while still being within the scope of the present invention.

Fluid-exiting apertures 102 extend through the valve body 100 in fluid communication with the oil passages 114. Nozzles 122, described in greater detail below, will be connected to the oil-exiting apertures 102 to divert oil under pressure to the desired location. The valve body 100 may also have a mounting tab 106 having an aperture 108 through which a mounting bolt (not shown) can connect the oil jet 98 to the underside of an engine block (not shown).

With reference to FIG. 5, a fluid pressure actuated valve element 115 is placed within the valve element-retaining region 112 and is moveable longitudinally therealong between a valve-open position and a valve-closed position (FIG. 5 shows a valve closed position). The present embodiment utilizes an inline, ball-type check valve. However, other types of valves could be used. The valve element 115 of the present embodiment is a ball 118, although other elements may be utilized, such as a piston. The ball 118 is biased into a valve-closed position by a compression spring 116 located within the valve element-retaining region 112.

A cap 120, having a fluid-entering aperture 124 therethrough, is coaxially connected to the valve body 100 relative to valve element-retaining region 112 so as to retain the ball 118 and spring 116 within the valve element-retaining region 112. The cap 120 further includes a sleeve 135. The sleeve 135 may either be integrally formed with the cap 120, or it can be connected therewith through an additional process, e.g., welding, fastening, etc. The sleeve 135 further includes walls 140 that extend inwardly within the cavity 104. In the present embodiment, the surface of the walls 140 are semi-circular in shape so as to retain the valve element ball or piston, as the case may be, generally between the walls 140 when the oil pressure is not sufficient to overcome the force of the spring 116 or the oil pressure has dropped and the spring 116 urges the ball 118 against the seat. This allows the valve element 115 to float within the sleeve 135 at low and transitional pressures and prevents the valve element 115 from knocking against the underside of the cap 120 as the pressure drops. It should be noted that while the cap 120 is shown in cross-section in FIG. 5, it is removed in FIG. 6 for the purpose of showing additional detail.

For operation, the oil jet 98 is connected to the engine block with a mounting bolt through the mounting aperture 108 in the mounting tab 106. The nozzles 122 are positioned so as to provide oil to a desired location. Oil under pressure is supplied to the oil jet 98 typically through an oil line (not shown) that is connected to the oil jet valve body 100 along perimeter 130. Oil under pressure is then drawn from an oil reservoir (not shown) through an oil pump (not shown) to the cap aperture 124.

With continued reference to FIG. 5 and FIG. 6, when the oil pressure is above a predetermined value, oil under pressure overcomes the spring force and depresses the ball 118 within the valve element-retaining region 112 to a valve-open position. With the ball 118 no longer in its resting valve-closed position seated on the underside of the cap aperture 124, oil is permitted to flow through the cap aperture 124, into the valve element-retaining region 112, and around and over the ball 118 and into the oil passages 114. Oil under pressure passes through the oil passages 114 and through the oil-exiting apertures 102 to the nozzle 122. Oil under pressure is sprayed from the nozzle 122 upon the desired location, e.g. the pistons.

The ball 118 is forced into a valve-open position as long as the oil pressure is maintained above the predetermined value. When the oil pressure falls below the predetermined value, the spring 116 urges the ball 118 to a valve-closed position and seats the ball 118 against the underside of the cap aperture 124 to prevent a siphoning off of oil pressure. In particular as the pressure drops, the ball 118 comes into contact with the walls 140 of the sleeve 135 of the cap 120 and softly contacts the underside of the cap aperture 124. This prevents the ball 118 from "knocking" against the underside of the cap aperture 124, thus reducing the noise the oil jet 98 produces during operation.

The valve element-retaining region 112 permits the ball 118 to move longitudinally therein between a valve-closed position and a valve-open position while restraining the ball 118 from vacillating and causing aeration and cavitation of the oil. Therefore, the ball 118 cannot vacillate within the cavity 104 in response to the flow of oil over and around the ball 118. Further, the walls 140 of the sleeve 135 of the cap 120 prevent the ball 118 from vacillating, oscillating or fluttering during low and transitional oil pressures. In particular, when the oil pressure is not sufficient enough to overcome the force of the spring 116 some pressure is present, the ball 118 can flutter or oscillate in place. The walls 140 are sized so as to prevent the ball 118 from oscillating or fluttering. During this period, the ball 118 floats within the sleeve 135 because there is not sufficient room for it to be moved anyway but longitudinally. This reduces the noise created during operation of the oil jet 98.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter.

Having thus described the invention, I claim:

1. A fluid jet comprising:
    a valve body;
    a pair of confronting walls within said valve body;
    at least one fluid passage extending longitudinally within at least a portion of said valve body, said fluid passage defined by a space between said confronting walls;
    a valve element-retaining region extending longitudinally within said valve body between said confronting walls and interior to said at least one fluid passage;
    a fluid pressure actuated valve element located within said valve element-retaining region and moveable longitudinally therein between a valve open position and a valve closed position, wherein said valve element is restrained from vacillating within said valve body by said valve element retaining region; and
    a sleeve extending inwardly within said valve body, wherein said valve element is retained within said sleeve at the valve closed position, wherein fluid does not flow from the sleeve to the valve body at the valve closed position and further wherein the valve element at least substantially exits the sleeve at the valve open position, wherein the valve element floats along the length of the sleeve at low and transitional pressures to prevent said valve element from knocking against the sleeve as pressure drops.

2. The fluid jet of claim 1, wherein said fluid passage is in fluid communication with at least a portion of said valve element retaining region.

3. The fluid jet of claim 2, further comprising a cap, said cap including a sleeve.

4. The fluid jet of claim 3, wherein said sleeve is integrally formed with said cap.

5. The fluid jet of claim 3, wherein said sleeve is connected with said cap.

6. The fluid jet of claim 3, wherein said cap has a fluid-entering aperture therethrough, said cap coaxially connected to said valve body relative to said valve element retaining region so as to retain said valve element therein.

7. A fluid jet comprising:
a valve body;
a pair of confronting walls within said valve body;
a valve element-retaining region extending between said confronting walls longitudinally within at least a portion of said valve body;
at least one fluid passage extending longitudinally within at least a portion of said valve body and in fluid communication with at least a portion of said valve element-retaining region, said fluid passage defined by a space between said confronting walls;
at least one fluid-exiting aperture through said valve body in fluid communication with said at least one fluid passage;
a fluid pressure actuated valve element located within said valve element-retaining region and moveable longitudinally therealong between a valve open position and a valve closed position, wherein said valve element is restrained from vacillating within said valve body by said valve element retaining region, and further wherein the valve element has a length; and
a sleeve extending inwardly within said valve body, where said sleeve has walls defining a valve element-retaining region within the sleeve, the walls having a length greater than one-half of the length of the valve element to allow said valve element to float within said sleeve at low and transitional pressures to prevent said valve element from knocking against the sleeve as pressure drops.

8. The fluid jet of claim 7, further comprising at least one nozzle connected to said at least one fluid-exiting aperture so as to direct fluid under pressure to a desired location.

9. The fluid jet of claim 8, further comprising a cap, said cap including said sleeve.

10. The fluid jet of claim 9, wherein said valve element has a diameter substantially equal to an interior diameter of said sleeve.

11. The fluid jet of claim 10, wherein said cap has a fluid-entering aperture therethrough, said cap coaxially connected to said valve body relative to said valve element-retaining region so as to retain said valve element therein.

12. The fluid jet of claim 11, further comprising a spring located within said valve element-retaining region biasing said valve element toward said cap.

13. The fluid jet of claim 12, wherein said valve element is spring biased against said fluid-entering aperture during a valve closed position and is movable against said spring along said valve element-retaining region during a valve open position in response to a predetermined oil pressure.

14. A fluid jet comprising:
a valve body;
a pair of confronting walls within said valve body;
a valve element-retaining region extending between said confronting walls longitudinally within at least a portion of said valve body;
at least one fluid passage extending longitudinally within at least a portion of said valve body and in fluid communication with at least a portion of said valve element-retaining regions, said fluid passage defined by a space between said confronting walls;
at least one fluid-exiting aperture through said valve body in fluid communication with said at least one fluid passage;
a fluid pressure actuated valve element located within said valve element-retaining region and moveable longitudinally therealong between a valve open position and a valve closed position, wherein said valve element is restrained from vacillating within said valve body by said valve element retaining region, and further wherein fluid flows through the valve body at the valve open position and fluid does not flow through the valve body at the valve closed position; and
a cap connected to said valve body, said cap having a sleeve extending inwardly within said valve body, the sleeve having an interior diameter substantially equal to a diameter of the valve element, wherein said valve element and said sleeve substantially prevent fluid from flowing through the valve body at a floating position between the valve open position and the valve closed position, and further wherein said valve element floats within said sleeve at low and transitional pressures to prevent said valve element from knocking against the sleeve as pressure drops.

15. The fluid jet of claim 14, wherein said valve element is retained within said sleeve when fluid pressure is below a predetermined pressure.

16. The fluid jet of claim 15, wherein said valve element is a ball.

17. The fluid jet of claim 16, wherein said valve body is die cast from powdered metal.

18. The fluid jet of claim 17, wherein said valve element is actuated to a valve-open position along said valve element-retaining region in response to a predetermined fluid pressure acting on said valve element.

19. The fluid jet of claim 18 wherein said at least one wall includes a semi-circular wall portion partially defining said valve element-retaining region.

* * * * *